United States Patent
Hepburn

(10) Patent No.: US 7,908,353 B2
(45) Date of Patent: Mar. 15, 2011

(54) MANAGING OVERLAPPING ADDRESS SPACES

(75) Inventor: Andrew Neil Cameron Hepburn, Surrey (GB)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 12/101,181

(22) Filed: Apr. 11, 2008

(65) Prior Publication Data

US 2009/0259740 A1   Oct. 15, 2009

(51) Int. Cl.
*G06F 15/173* (2006.01)

(52) U.S. Cl. .......................................... 709/223

(58) Field of Classification Search ........... 709/220–226
See application file for complete search history.

(56) References Cited

U.S. PATENT DOCUMENTS

| | | | | |
|---|---|---|---|---|
| 5,878,420 A * | 3/1999 | de la Salle | | 1/1 |
| 6,144,961 A * | 11/2000 | de la Salle | | 707/10 |
| 6,895,429 B2 * | 5/2005 | Banga et al. | | 709/215 |
| 6,948,003 B1 * | 9/2005 | Newman et al. | | 709/250 |
| 7,360,034 B1 * | 4/2008 | Muhlestein et al. | | 711/148 |
| 7,411,975 B1 * | 8/2008 | Mohaban | | 370/466 |
| 7,441,045 B2 * | 10/2008 | Skene et al. | | 709/241 |
| 7,467,215 B2 * | 12/2008 | Ould-Brahim | | 709/230 |
| 2002/0165982 A1 | 11/2002 | Leichter et al. | | |
| 2005/0120160 A1 * | 6/2005 | Plouffe et al. | | 711/1 |
| 2005/0149633 A1 | 7/2005 | Natarajan et al. | | |
| 2005/0271047 A1 * | 12/2005 | Huonder et al. | | 370/389 |
| 2006/0075001 A1 * | 4/2006 | Canning et al. | | 707/203 |
| 2006/0242685 A1 * | 10/2006 | Heard et al. | | 726/3 |
| 2007/0240150 A1 * | 10/2007 | Gangwar et al. | | 717/174 |
| 2007/0260721 A1 * | 11/2007 | Bose et al. | | 709/223 |
| 2008/0162516 A1 * | 7/2008 | Shinomiya | | 707/100 |

\* cited by examiner

*Primary Examiner* — Wing F Chan
*Assistant Examiner* — Alicia Baturay
(74) *Attorney, Agent, or Firm* — Stephen R. Tkacs; Stephen J. Walder, Jr.; Jeffrey S. LaBaw

(57) ABSTRACT

A network management method and system. The method includes identifying by a computing system, overlapping address spaces between networks. The computing system generates virtual servers associated with the overlapping address spaces. The computing system determines and configures a routing technique for routing the virtual servers to the overlapping address spaces. The computing system installs a copy of management software on each of the virtual servers. The computing system performs a network management installation process. The network management process prepares the virtual servers for managing the overlapping address spaces. The computing system generates and stores a log report associated with the network management installation process.

20 Claims, 7 Drawing Sheets

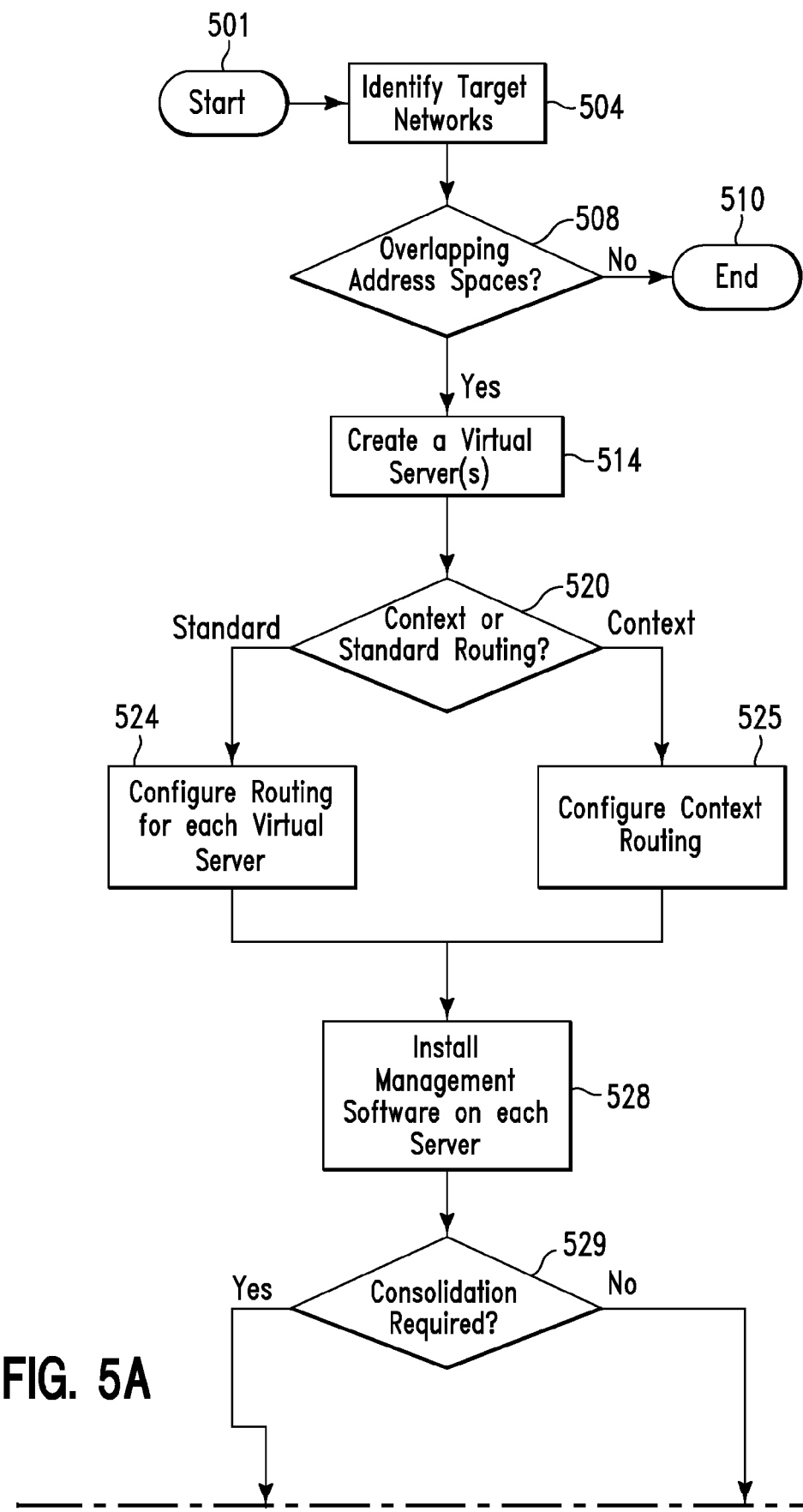

US 7,908,353 B2

MANAGING OVERLAPPING ADDRESS SPACES

FIELD OF THE INVENTION

The present invention relates to a method and associated system for managing overlapping address spaces between networks.

BACKGROUND OF THE INVENTION

Managing data flow to a same destination typically comprises an inefficient process with little flexibility. Accordingly, there exists a need in the art to overcome at least some of the deficiencies and limitations described herein above.

SUMMARY OF THE INVENTION

In one illustrative embodiment, a network management method comprises identifying, by a computing system, overlapping address spaces between a plurality of networks and generating, by the computing system, virtual servers associated with the overlapping address spaces. Each virtual server of the virtual servers is associated with an overlapping address space of the overlapping address spaces. The method further comprises installing, by the computing system, a copy of management software on each virtual server of the virtual servers, installing, by the computing system, consolidation software on a consolidation server, configuring, by the computing system, each copy of the management software for discovering and managing an associated overlapping address space of the overlapping address spaces, configuring, by the computing system, each virtual server of the virtual servers for exporting discovered overlapping address spaces of the overlapping address spaces, configuring, by the computing system, the consolidation software for receiving and consolidating the discovered overlapping address spaces form the virtual servers, configuring, by the computing system, each virtual server of the virtual servers for exporting event data associated with the overlapping address spaces, and configuring, by the computing system, the consolidation software for receiving and consolidating the event data from the virtual servers.

In other illustrative embodiments, a computer program product comprises a computer storage medium comprising a computer readable program embodied therein. The computer readable program code is configured to perform a network management method upon being executed by a processor of a computing system to perform various ones, and combinations of, the operations outlined above with regard to the method illustrative embodiment.

In other illustrative embodiments, a computing system comprises a processor coupled to a computer-readable memory unit. The memory unit stores instructions that when executed by the processor cause the processor to perform various ones, and combinations of, the operations outlined above with regard to the method illustrative embodiment.

The present invention advantageously provides a simple method and associated system capable of managing data flow to a same destination.

BRIEF DESCRIPTION OF THE DRAWINGS

FIG. 5 which includes FIGS. 5A and 5B illustrates a flowchart describing an algorithm used by the systems of FIGS. 1-4 for installing and generating a management system for managing overlapping address spaces, in accordance with embodiments of the present invention.

DETAILED DESCRIPTION OF THE INVENTION

Figure 1:
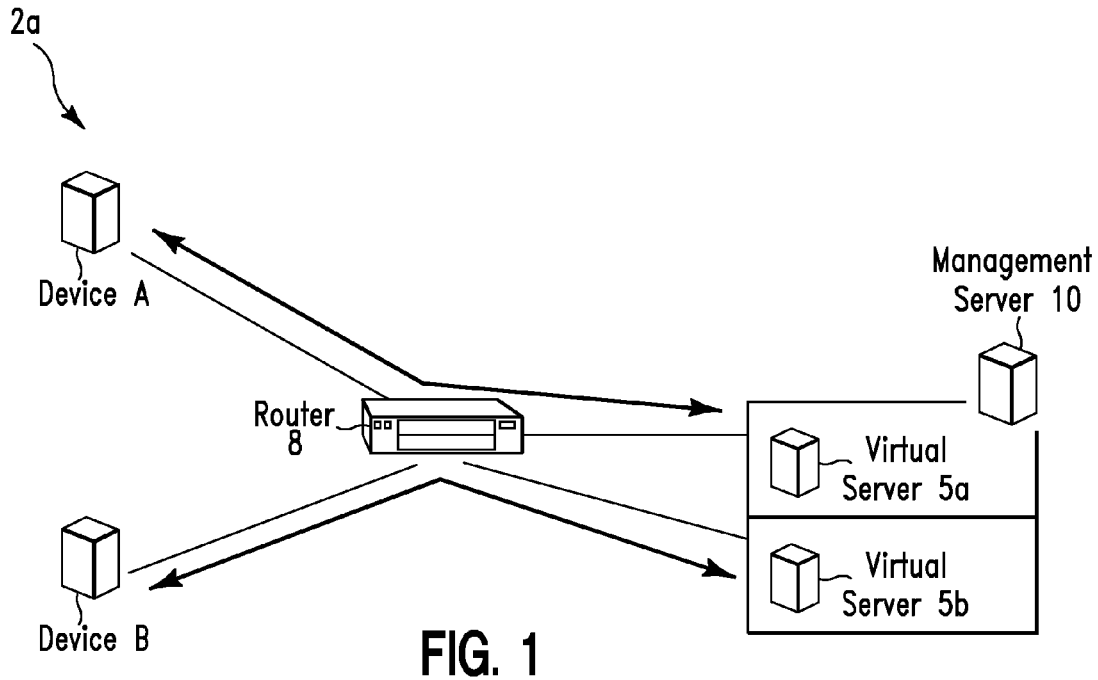
FIG. 1 illustrates a context routing based system comprising virtual servers for managing overlapping address spaces, in accordance with embodiments of the present invention.

FIG. 1 illustrates a context routing based system 2a comprising virtual servers 5a and 5b for managing overlapping address spaces, in accordance with embodiments of the present invention. The overlapping address spaces may comprise Internet protocol (IP) addresses. Context based routing comprises a routing method wherein a routing decision is based on a criteria in a packet. The criteria may include a destination address. Context based routing allows a unique destination to be determined from combining packet attributes. System 2a comprises a device A, a device B, a router 8, a management server 10, a virtual server 5a, and a virtual server 5b. Device A may comprise a plurality of networked devices (e.g., computers, switches, routers, etc). Device B may comprise a plurality of networked devices (e.g., computers, switches, routers, etc). Device A comprises a same IP address (e.g., 10.0.0.1) as Device B (i.e., overlapping address spaces). Note that the IP address of 10.0.0.1 is used for illustration purposes and that any IP address may be used. In order for management server 10 (e.g., with an address of 192.168.0.1) to contact and communicate with device A and device B (i.e., via router 8) comprising a same IP address, virtual servers 5a and 5b are created (i.e., to overcome duplicate IP address ranges). Note that virtual servers 5a and 5b are shown for illustration purposes and that any number of virtual servers may be used (i.e., a different virtual server for each overlapping address). Router 8 comprises an IP address of 192.168.0.2 (i.e., for illustration purposes). The (independent) virtual servers 5a and 5b may be running on a same or different physical hardware. Each of virtual servers 5a and 5b comprises a different IP address (i.e., a unique virtual server exists for each overlapping address space). Virtual server 5a comprises an IP address of 192.168.1.1. Virtual server 5b comprises an IP address of 192.168.1.2. Note that the IP addresses for virtual servers 5a and 5b are described for illustration purposes and that any IP addresses may be used. Each of virtual servers 5a and 5b comprises a complete installation of network management software that requires direct communication with remotely managed devices. A context based routing method may then be performed based on a source address of a virtual server (e.g., virtual servers 5a and 5b). A virtual server is defined herein as a partial or full copy of a server (including an operating system) running under the management of a virtual server manager (e.g., management server 10). Multiple virtual servers may run on a same physical host hardware, providing the external logical appearance of multiple independent servers. A virtual server comprises all the characteristics of a standalone "real" server. Any virtualising technology used with system 2a is transparent to a virtual server. The following functions are performed with respect to system 2a of FIG. 1:

1. Creation of virtual servers spread across one or more physical servers. One virtual server is required for each address space that is non-unique.
2. Installation of a suitable set of management software within each of virtual servers 5a and 5b. This may be limited to the software components that directly access a duplicated device or could be an entire install.
3. Ensuring that routing to the address spaces from each of virtual servers 5a and 5b is enabled. Either using standard routing (one entry router per address space) or by using context based routing (e.g., mpls based routing, vrf based routing, etc).
4. Usage of management software (e.g., during: discoveries, monitoring, etc) is performed within virtual server 5a and 5b to an associated address space.
5. Security is maintained by the separation of virtual servers 5a and 5b.

Figure 2:
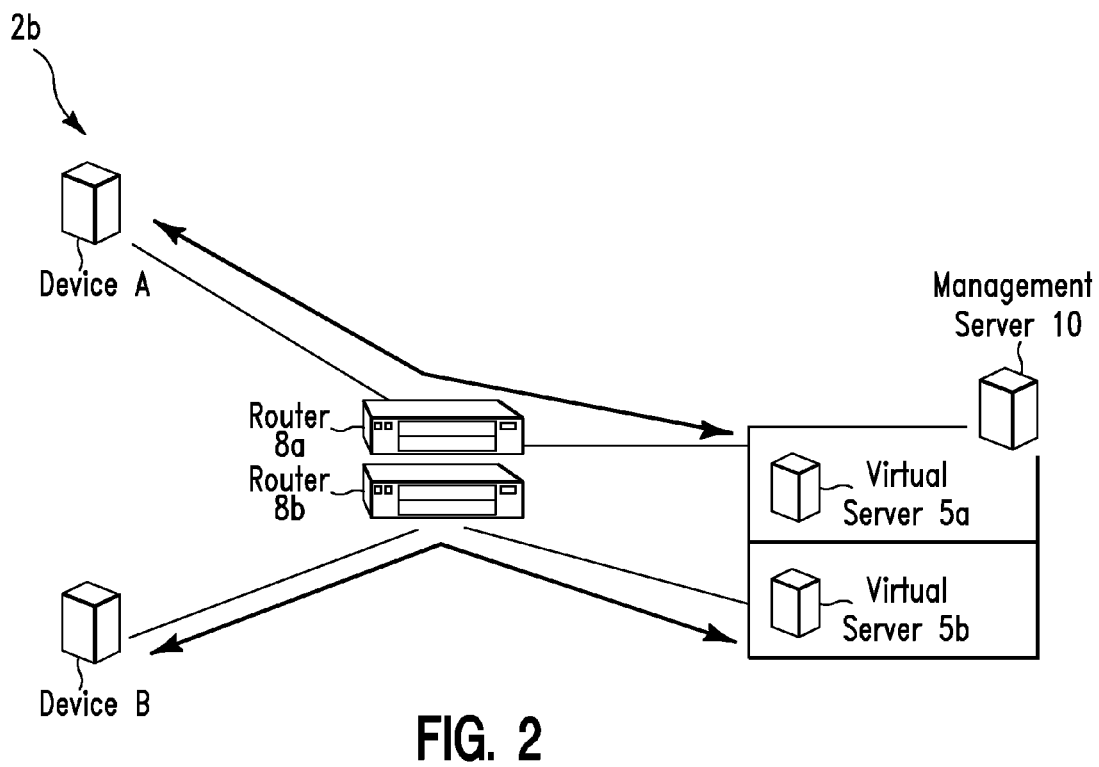
FIG. 2 illustrates a standard routing based system, in accordance with embodiments of the present invention.

FIG. 2 illustrates a first alternative to system 2a of FIG. 1, in accordance with embodiments of the present invention. In contrast to system 2a of FIG. 1, system 2b of FIG. 2 comprises a standard routing based system 2b comprising two routers 8a and 8b. Router 8a comprises an IP address of 192.168.0.2 and router 8b comprises an IP address of 192.168.0.3 (i.e., for illustration purposes). In standard routing based system 2b, packets are directed by each of routers 8a and 8b to appropriate interfaces in order to reach the desired destination addresses. Routing decisions are determined based on a destination address of the packet. Each of virtual servers 5a and 5b in system 2b uses an associated router (i.e., router 8a for virtual server 5a and router 8b for virtual server 5b) for managing overlapping address spaces.

Figure 3:
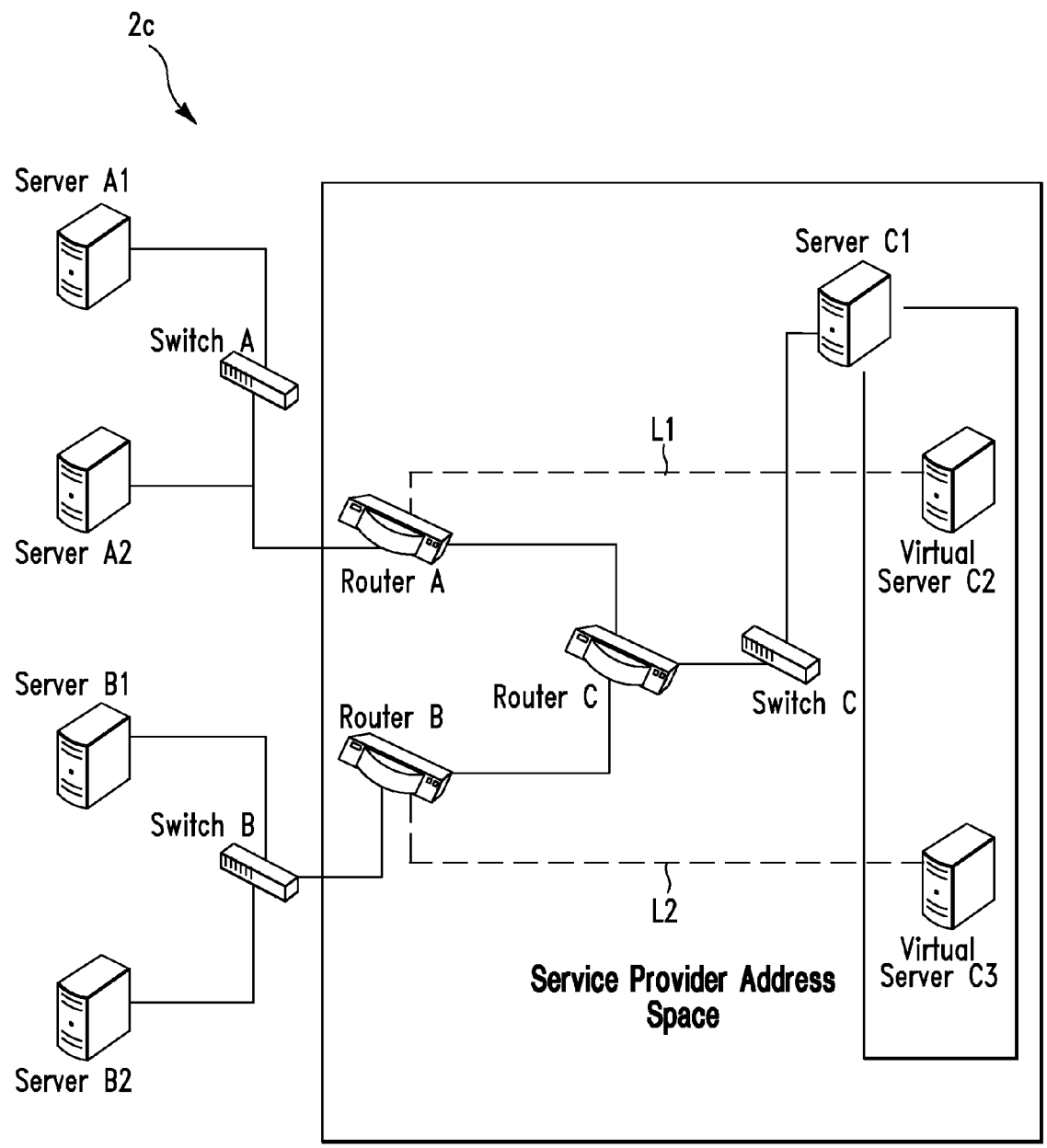
FIG. 3 illustrates a first alternative to systems of FIGS. 1 and 2, in accordance with embodiments of the present invention.

FIG. 3 illustrates a second alternative to system 2a of FIG. 1, in accordance with embodiments of the present invention. In contrast to system 2a of FIG. 1, system 2c of FIG. 3, illustrates a physical server C1 hosting two virtual servers C2 and C3 (each comprising individual copies of a management software application). Virtual servers C2 and C3 are routed directly (i.e., via links L1 and L2 respectively) into address spaces A and B respectively via router A (and switch A) and router B (and switch B) instead of router C (router A and router B would have a unique address within a provider address space). Physical server C1 is routed to router C via switch C.

Figure 4:
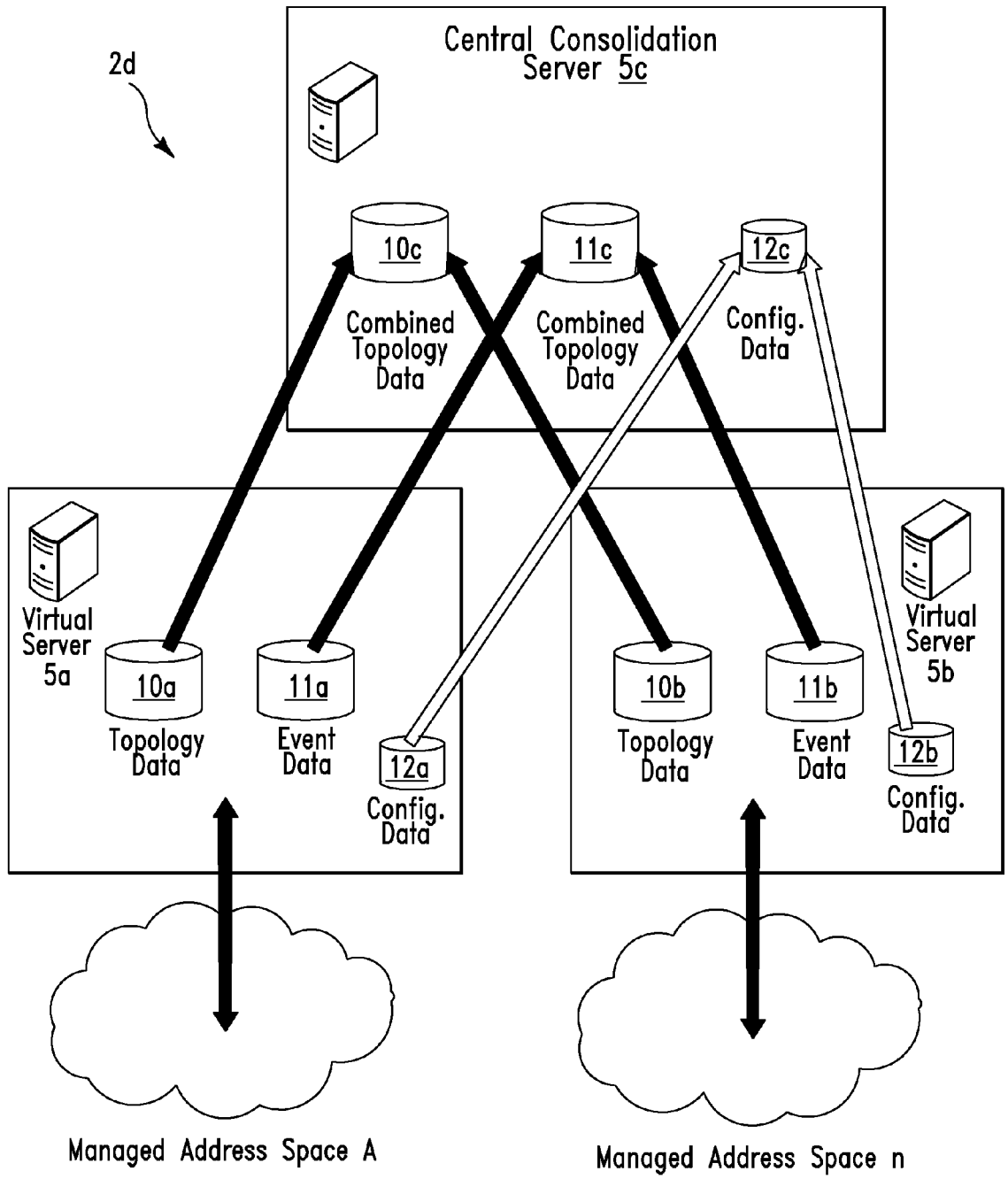
FIG. 4 illustrates a system comprising a detailed view of the virtual servers of FIGS. 1 and 2, in accordance with embodiments of the present invention.

FIG. 4 illustrates a system 2d comprising a detailed view of virtual servers 5a and 5b of FIGS. 1 and 2, in accordance with embodiments of the present invention. Additionally, system 2d comprises a detailed view of a central consolidation server 5c for managing virtual servers 5a and 5b. Systems 2a and 2b of FIGS. 1 and 2 are used to generate a single management instance for each overlapping address space within each of virtual servers 5a and 5b. Subsequent management of virtual servers 5a and 5b may be performed as is (i.e., standalone by virtual servers 5a and 5b). Alternatively, subsequent management of virtual servers 5a and 5b may be consolidated into a single management view (i.e., by central consolidation server 5c) of the managed estate (i.e., managed address space A and managed address space B). Managed address space A may comprise device A of FIGS. 1 and 2 and/or additional networked devices. Managed address space B may comprise device B of FIGS. 1 and 2 and/or additional networked devices. As with systems 2a and 2b of FIGS. 1 and 2, system 2d requires that management for each overlapping address space is performed from an associated virtual server. Central consolidation server 5c allows for ease of administration and a centralized visualization of the individual overlapping address spaces. Virtual server 5a comprises (i.e., for the management of the managed address space associated with virtual server 5a) topology data in a memory unit (e.g., a database) 10a, event data in a memory unit (e.g., a database) 11a, and configuration data in a memory unit (e.g., a database) 12a. Virtual server 5b comprises (i.e., for the management of the managed address space associated with virtual server 5b) topology data in a memory unit (e.g., a database) 10b, event data in a memory unit (e.g., a database) 11b, and configuration data in a memory unit (e.g., a database) 12b. Central consolidation server 5c comprises a combined topology data (i.e., combined from virtual servers 5a and 5b) in a memory unit (e.g., a database) 10c, a combined event data (i.e., combined from virtual servers 5a and 5b) in a memory unit (e.g., a database) 11c, and a combined configuration data (i.e., combined from virtual servers 5a and 5b) in a memory unit (e.g., a database) 12c. Topology data (i.e., a topology model) comprises a virtual representation of a managed overlapping address space. The virtual representation describes devices that are managed by this instance of the management software. This model may comprise logical and physical relationship information as well as asset information related to the managed devices. Configuration data (e.g., files) describe behavior of a management instance. For example, behavior of a management instance may be related to: how often and by what methods an estate is discovered, with what frequency and threshold conditions devices are polled for events, etc. Event data comprises address space specific event data. Each of the managed overlapping address spaces topology data and events data are consolidated central consolidation server 5c. Central consolidation server 5c may comprise an additional virtual server on a same physical host or any other suitable location. Central consolidation server 5c manages address space configuration centrally to enable easier administration. Central consolidation server 5c consolidates topology data and allows a consolidation (joining) of the address space networks into a contiguous topology. This ability is managed and provided by central consolidation server 5c.

Figure 5B:
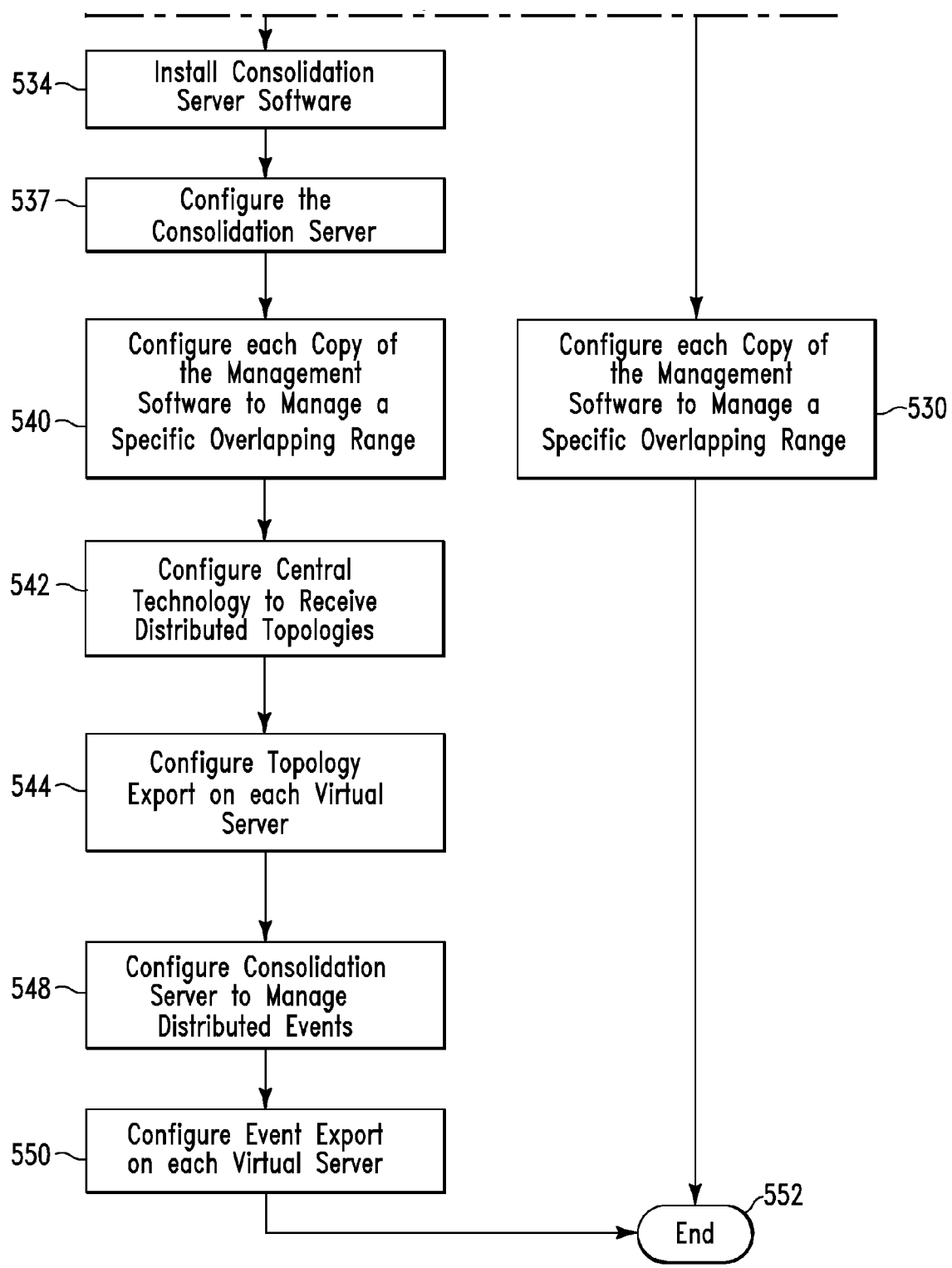

FIG. 5 which includes FIGS. 5A and 5B illustrates a flowchart describing an algorithm used by systems 2a-2d of FIGS. 1-4 for installing and generating a management system for managing overlapping address spaces, in accordance with embodiments of the present invention. The algorithm of FIG. 5 illustrates steps required to configure each virtual server for management of an individual overlapping address space. Additionally, the algorithm of FIG. 5 illustrates the steps performed by a central server to consolidate a distributed topology and event data. In step 501, the process is initiated. In step 504, target networks are identified and transmitted to a management server (e.g., management server 10 of FIGS. 1 and 2). In step 508 it is determined if the target networks comprise overlapping address spaces. If in step 508 it is determined that the target networks do not comprise overlapping address spaces then the process terminates in step 510. If in step 508 it is determined that the target networks do comprise overlapping address spaces then in step 514 (n) virtual servers are created. n may comprise any number. A virtual server is created for each identified overlapping address space. Additionally, a virtual server may be created for a central consolidation system (e.g., central consolidation server 5c of FIG. 4). A minimum of 2 virtual servers are created with no limitation on a maximum number of virtual servers. Additionally it is possible to use one of the virtual servers (i.e., for an overlapping address space) in a dual capacity as both a managing server and a central consolidation server. Creation of the virtual servers is a configuration activity. Each virtual server is created and configured with a set of resource parameters (e.g., CPU, available disc space, attached devices, etc). In step 520, it is determined if a routing method used for routing the virtual servers comprises a context based routing method or a standard based routing method. If in step 520, it is determined that a routing method used comprises a context based routing method then in step 525, context based routing is configured. If in step 520, it is determined that a routing method used comprises a standard based routing method then in step 524, standard routing is configured for each virtual server. In step 528, management software in installed on each virtual server. Each virtual server will require a copy of network management software (e.g., discovery, event manager, configuration, etc.). In step 529, it is determined if consolidation of the virtual servers is required.

If in step 529, it is determined that consolidation of the virtual servers is not required then in step 530, each copy of the management software (i.e., on each virtual server) is configured to manage a specific overlapping address range. Additionally, in step 530 a log report indicating all steps in the process may be generated and stored. The process terminates in step 552.

If in step 529, it is determined that consolidation of the virtual servers is required then in step 534, consolidation server software is installed on a consolidation server. In step 537, the consolidation server is configured to manage the virtual servers. In step 540, each copy of the management software (i.e., on each virtual server) is configured to manage a specific overlapping address range. In step 542, a central topology (e.g., a network model or map) on the consolidation server is configured to receive address space topologies from each of the virtual servers. In step 544, each virtual server is configured to export an associated address space topology to the consolidation server. In step 548, the consolidation server is configured to manage distributed events from the virtual servers. In step 550, each virtual server is configured to export an associated event(s) to the consolidation server. Additionally, in step 550 a log report indicating all steps in the process may be generated and stored. The process terminates in step 552.

Figure 6:
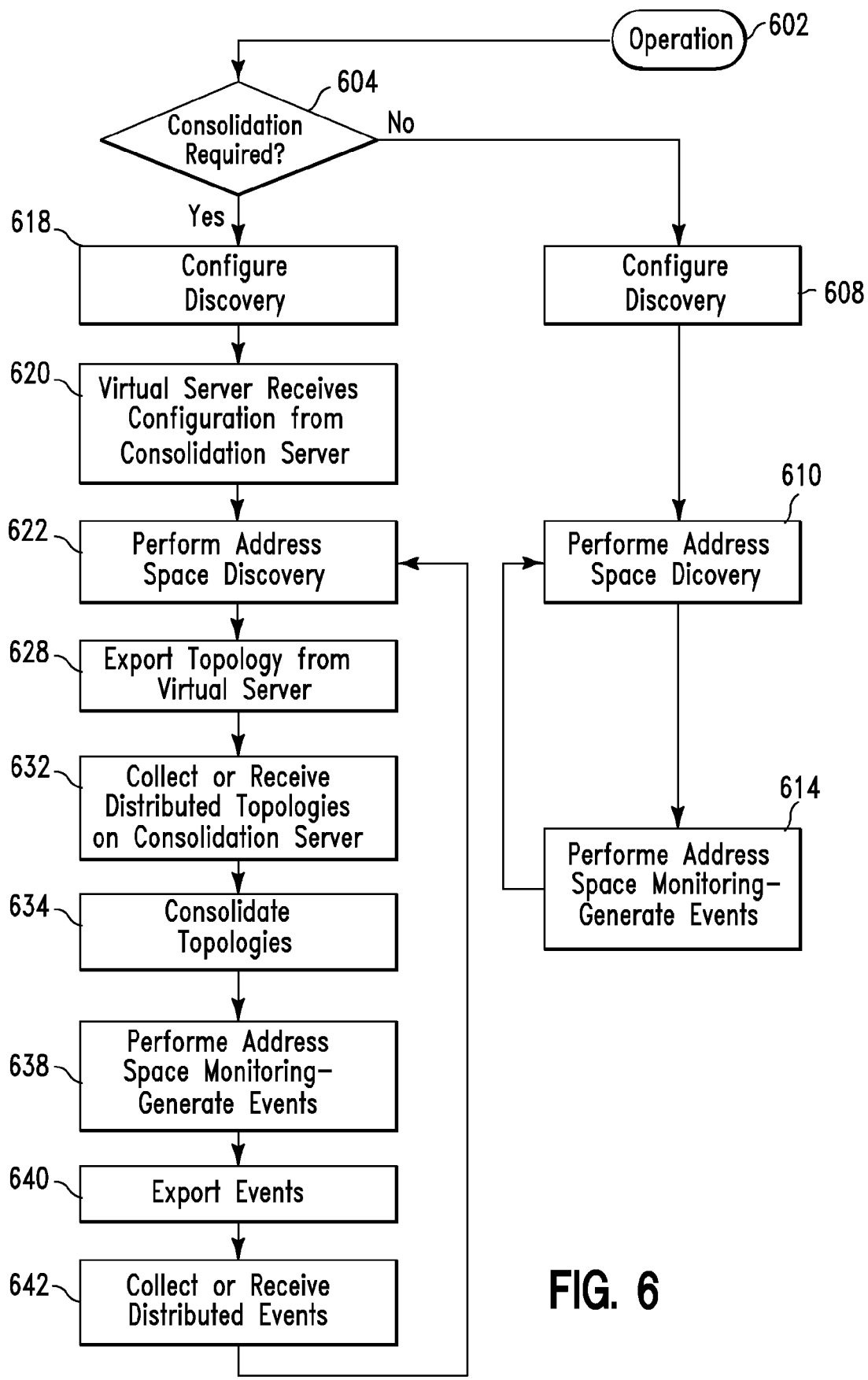
FIG. 6 illustrates a flowchart describing an algorithm used by the systems of FIGS. 1-4 for operating the management system generated by the algorithm of FIG. 5, in accordance with embodiments of the present invention.

FIG. 6 illustrates a flowchart describing an algorithm used by systems 2a-2d of FIGS. 1-4 for operating the management system generated by the algorithm of FIG. 5, in accordance with embodiments of the present invention. In step 602, the process is initiated. In step 604, it is determined if consolidation of the virtual servers is required.

If in step 608, it is determined that consolidation of the virtual servers is not required then in step 608, an address space discovery is configured for each virtual server. In step 610, each virtual server will perform a network discovery of the allocated address space. This discovery may be staged, on demand, or triggered. A result of the discovery will be a topology of the target address space. In step 614, each virtual server will manage the devices in the target address space in order to generate events about the status of the devices and step 610 is repeated. This management will be performed from the virtual servers using the routing mechanisms put in place during the install/set-up process described with respect to FIG. 5.

If in step 608, it is determined that consolidation of the virtual servers is required then in step 618, an address space discovery is configured for each virtual server. In step 620, each unique address space discovery is configured from the consolidation server and distributed to the virtual servers via the associated address spaces. In step 622, each virtual server will perform a network discovery of the allocated address space. This discovery may be staged, on demand, or triggered. A result of the discovery will be a topology of the target address space. In step 628, (i.e., after the discovery is completed) the topology is prepared for export to the consolidation server. The export could be a push from the virtual server or a pull from the consolidation server. In step 632, the consolidation server either receives or retrieves the individual address space topologies from the virtual servers managing the individual address spaces. In step 634, all of the consolidation server topologies are combined into a single topology representing the entire managed estate. Individual topologies may be joined to others or left as isolated address spaces. In step 638, each virtual server will manage the devices in the address space to generate events about the status of the devices. This management will be performed from the virtual server using the routing mechanisms put in place during the install/set-up process described with reference to the algorithm of FIG. 5. In step 640, events generated during step 638 are transmitted to or retrieved by the consolidation server. This mechanism may be a push or pull. In step 642, the consolidation server manages the reception or retrieval of event information and consolidates these events into a single event store holding events about the entire managed estate and step 622 is repeated. Operationally, the steps above are repeated as often as required. An address space discovery (i.e., step 622) will be performed when the topology of the address space has changed (e.g., an addition or removal of a device). Discoveries within each address space are not required to be simultaneous or synchronized with each other. Each virtual server may discover the address space as required with no impact on the management of the other address spaces. Event data will typically be continuously exported from the virtual server event manager to the consolidation event manager.

Figure 7:
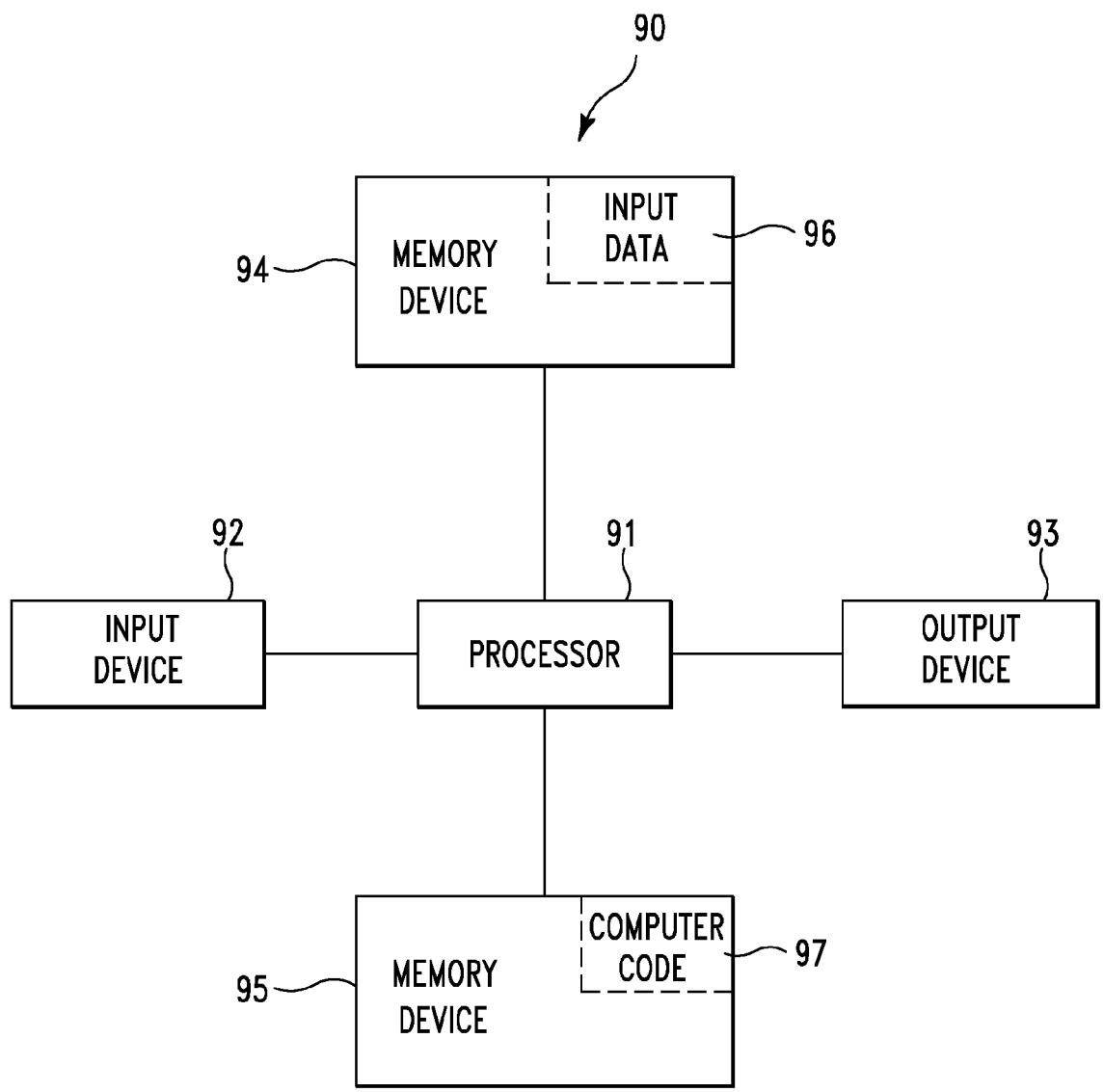
FIG. 7 illustrates a computer apparatus used for managing overlapping address spaces, in accordance with embodiments of the present invention.

FIG. 7 illustrates a computer apparatus 90 (e.g., virtual servers 5a and 5b or management server 10 of FIG. 1) used for managing overlapping address spaces, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 5 and 6) for managing overlapping address spaces. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may comprise the algorithms of FIGS. 5 and 6 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to manage overlapping address spaces. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for managing overlapping address spaces. In another embodiment, the invention provides a business method that performs the process steps of the invention on a subscription, advertising, and/or fee basis. That is, a service provider, such as a Solution Integrator, could offer to manage overlapping address spaces. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A network management method comprising:
   identifying, by a computing system, overlapping address spaces between a plurality of networks;
   generating, by the computing system, virtual servers associated with the overlapping address spaces, wherein each virtual server of the virtual servers is associated with an overlapping address space of the overlapping address spaces;
   installing, by the computing system, a copy of management software on each virtual server of the virtual servers;
   installing, by the computing system, consolidation software on a consolidation server;
   configuring, by the computing system, each copy of the management software for discovering and managing an associated overlapping address space of the overlapping address spaces;
   configuring, by the computing system, each virtual server of the virtual servers for exporting discovered overlapping address spaces of the overlapping address spaces;
   configuring, by the computing system, the consolidation software for receiving and consolidating the discovered overlapping address spaces form the virtual servers;
   configuring, by the computing system, each virtual server of the virtual servers for exporting event data associated with the overlapping address spaces;
   configuring, by the computing system, the consolidation software for receiving and consolidating the event data from the virtual servers;
   providing a first virtual server within the virtual servers associated with a first overlapping address space of the overlapping address spaces;
   discovering, by said the virtual server, the first overlapping address space;
   generating, by the first virtual server, a first topology report indicating the first overlapping address space;
   storing, by the first virtual server, the first topology report;
   monitoring, by the first virtual server, the first overlapping address space;
   generating, by the first virtual server in response to monitoring the first overlapping address space, first events data indicating a status of first devices associated with the first overlapping address space;
   storing, by the first virtual server, the first events data; and
   transmitting, by the first virtual server to the consolidation server, the first topology report and the first events data.

2. The method of claim 1, further comprising:
   receiving, by the computing system, routing data;
   establishing, by the computing system, a routing technique for routing the virtual servers, the establishing based on the routing data; and
   configuring, by the computing system, the routing technique for routing each virtual server to an associated overlapping address space of the overlapping address spaces.

3. The method of claim 1, further comprising:
   receiving, by the computing system, the management software;
   performing, by the computing system, a network management installation process based on the determining, wherein the network management installation process prepares the virtual servers for managing the overlapping address spaces;
   generating, by the computing system, a log report associated with the network management installation process; and
   storing, by the computing system, the log report.

4. The method of claim 1, wherein each said virtual server has direct communications with an associated network of said plurality of networks.

5. The method of claim 1, wherein each said network comprises a router, a switch, and a server.

6. The method of claim 1, wherein said first virtual server is associated with a context based routing technique.

7. The method of claim 1, further comprising:
   providing a second virtual server of the virtual servers associated with a second overlapping address space;
   discovering, by the second virtual server, the second overlapping address space;
   generating, by the second virtual server, a second topology report indicating the second overlapping address space;
   storing, by the second virtual server, the second topology report;
   monitoring, by the second virtual server, the second overlapping address space;
   generating, by the second virtual server in response to monitoring the second overlapping address space, second events data indicating a status of second devices associated with the second overlapping address space;
   storing, by the second virtual server, the second events data; and
   transmitting, by the second virtual server to the consolidation server, the second topology report and the second events data, wherein the first topology report is combined with the second topology report to generate a combination topology report, and wherein the first events data is combined with the second events data to generate a combination events data.

8. The method of claim 1, wherein said discovering said first overlapping address space is performed on demand in response to a user defined command.

9. The method of claim 1, wherein said discovering said first overlapping address space is triggered in response to an automated command.

10. A computing system comprising a processor coupled to a non-transitory computer-readable memory unit, wherein the memory unit stores instructions that when executed by the processor implements a network management method, the method comprising:
identifying, by the computing system, overlapping address spaces between a plurality of networks;
generating, by the computing system, virtual servers associated with the overlapping address spaces, wherein each virtual server of the virtual servers is associated with an overlapping address space of the overlapping address spaces;
installing, by the computing system, a copy of management software on each virtual server of the virtual servers;
installing, by the computing system, consolidation software on a consolidation server;
configuring, by the computing system, each copy of the management software for discovering and managing an associated overlapping address space of the overlapping address spaces;
configuring, by the computing system, each virtual server of the virtual servers for exporting discovered overlapping address spaces of the overlapping address spaces;
configuring, by the computing system, the consolidation software for receiving and consolidating the discovered overlapping address spaces form the virtual servers;
configuring, by the computing system, each virtual server of the virtual servers for exporting event data associated with the overlapping address spaces;
configuring, by the computing system, the consolidation software for receiving and consolidating the event data from the virtual servers;
providing a first virtual server within the virtual servers associated with a first overlapping address space of the overlapping address spaces;
discovering, by said the virtual server, the first overlapping address space;
generating, by the first virtual server, a first topology report indicating the first overlapping address space;
storing, by the first virtual server, the first topology report;
monitoring, by the first virtual server, the first overlapping address space;
generating, by the first virtual server in response to monitoring the first overlapping address space, first events data indicating a status of first devices associated with the first overlapping address space;
storing, by the first virtual server, the first events data; and
transmitting, by the first virtual server to the consolidation server, the first topology report and the first events data.

11. The computing system of claim 10, the method further comprising:
receiving, by the computing system, routing data;
establishing, by the computing system, a routing technique for routing the virtual servers, the establishing based on the routing data; and
configuring, by the computing system, the routing technique for routing each virtual server to an associated overlapping address space of the overlapping address spaces.

12. The computing system of claim 10, the method further comprising:
receiving, by the computing system, the management software;
performing, by the computing system, a network management installation process based on the determining, wherein the network management installation process prepares the virtual servers for managing the overlapping address spaces;
generating, by the computing system, a log report associated with the network management installation process; and
storing, by the computing system, the log report.

13. The computing system of claim 10, wherein each said virtual server has direct communications with an associated network of said plurality of networks.

14. The computing system of claim 10, wherein each said network comprises a router, a switch, and a server.

15. The computing system of claim 10, wherein said first virtual server is associated with a context based routing technique.

16. The computing system of claim 10, wherein the method further comprises:
providing a second virtual server of the virtual servers associated with a second overlapping address space within the overlapping address spaces;
discovering, by the second virtual server, the second overlapping address space;
generating, by the second virtual server, a second topology report indicating the second overlapping address space;
storing, by the second virtual server, the second topology report;
monitoring, by the second virtual server, the second overlapping address space;
generating, by the second virtual server in response to monitoring the second overlapping address space, second events data indicating a status of second devices associated with the second overlapping address space;
storing, by the second virtual server, the second events data; and
transmitting, by the second virtual server to the consolidation server, the second topology report and the second events data, wherein the first topology report is combined with the second topology report to generate a combination topology report, and wherein the first events data is combined with the second events data to generate a combination events data.

17. The computing system of claim 10, wherein said discovering said first overlapping address space is performed on demand in response to a user defined command.

18. The computing system of claim 10, wherein said discovering said first overlapping address space is triggered in response to an automated command.

19. A computer program product, comprising a non-transitory computer storage medium comprising a computer readable program code embodied therein, the computer readable program code configured to perform a network management method upon being executed by a processor of a computing system, the method comprising:
identifying, by the computing system, overlapping address spaces between a plurality of networks;
generating, by the computing system, virtual servers associated with the overlapping address spaces, wherein each virtual server of the virtual servers is associated with an overlapping address space of the overlapping address spaces;

installing, by the computing system, a copy of management software on each virtual server of the virtual servers;

installing, by the computing system, consolidation software on a consolidation server;

configuring, by the computing system, each copy of the management software for discovering and managing an associated overlapping address space of the overlapping address spaces;

configuring, by the computing system, each virtual server of the virtual servers for exporting discovered overlapping address spaces of the overlapping address spaces;

configuring, by the computing system, the consolidation software for receiving and consolidating the discovered overlapping address spaces form the virtual servers;

configuring, by the computing system, each virtual server of the virtual servers for exporting event data associated with the overlapping address spaces;

configuring, by the computing system, the consolidation software for receiving and consolidating the event data from the virtual servers;

providing a first virtual server within the virtual servers associated with a first overlapping address space of the overlapping address spaces;

discovering, by said the virtual server, the first overlapping address space;

generating, by the first virtual server, a first topology report indicating the first overlapping address space;

storing, by the first virtual server, the first topology report;

monitoring, by the first virtual server, the first overlapping address space;

generating, by the first virtual server in response to monitoring the first overlapping address space, first events data indicating a status of first devices associated with the first overlapping address space;

storing, by the first virtual server, the first events data; and transmitting, by the first virtual server to the consolidation server, the first topology report and the first events data.

20. The computer program product of claim 19, the method further comprising:

providing a second virtual server of the virtual servers associated with a second overlapping address space within the overlapping address spaces;

discovering, by the second virtual server, the second overlapping address space;

generating, by the second virtual server, a second topology report indicating the second overlapping address space;

storing, by the second virtual server, the second topology report;

monitoring, by the second virtual server, the second overlapping address space;

generating, by the second virtual server in response to monitoring the second overlapping address space, second events data indicating a status of second devices associated with the second overlapping address space;

storing, by the second virtual server, the second events data; and transmitting, by the second virtual server to the consolidation server, the second topology report and the second events data, wherein the first topology report is combined with the second topology report to generate a combination topology report, and wherein the first events data is combined with the second events data to generate a combination events data.

* * * * *